June 27, 1939.　　　O. MEYER　　　2,163,796
PROCESS FOR THE RECOVERY OF MAGNESIUM
Filed Nov. 28, 1936
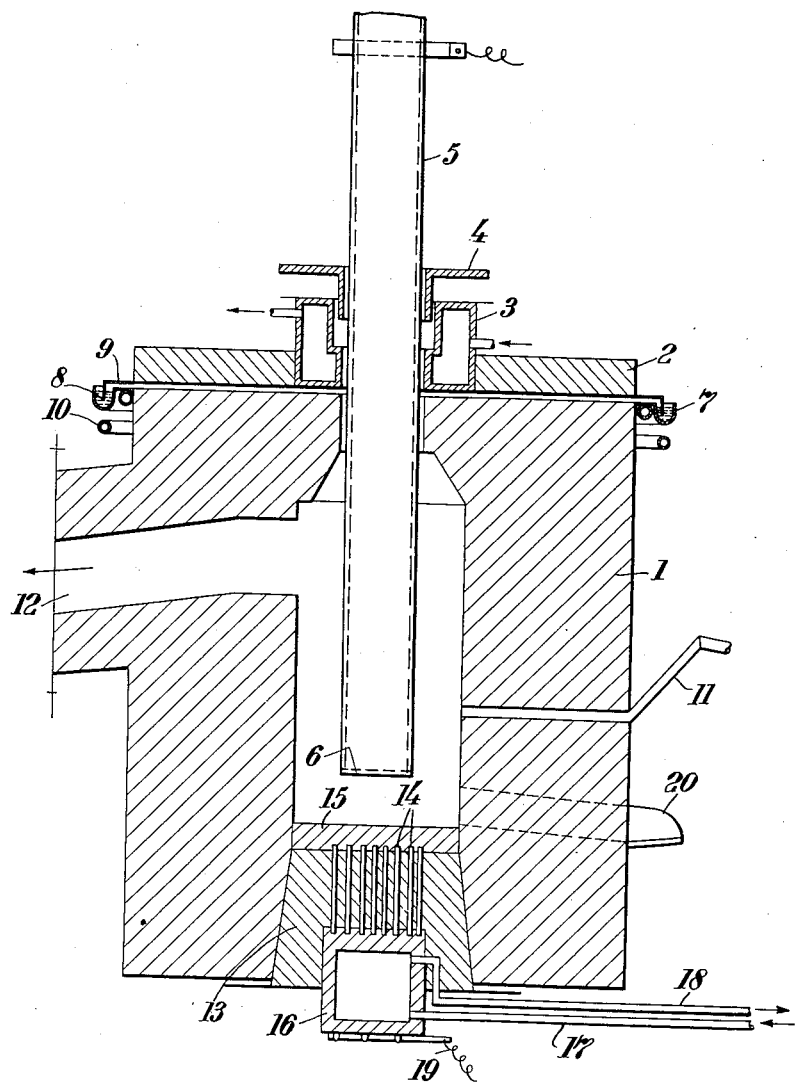
Inventor
OSKAR MEYER
By Attorney Patented June 27, 1939

2,163,796

UNITED STATES PATENT OFFICE 2,163,796

PROCESS FOR THE RECOVERY OF MAGNESIUM

Oskar Meyer, Bitterfeld, Germany, assignor, by mesne assignments, to Magnesium Development Corporation, a corporation of Delaware Application November 28, 1936, Serial No. 113,255
In Germany December 11, 1935

9 Claims. (Cl. 75—10)

This invention relates to a process for the electrothermal reduction of magnesiferous raw materials.

In order to produce magnesium from magnesiferous raw materials it has been proposed, inter alia, to employ an electro-arc furnace, using as electrode, a mixture of magnesium oxide or carbonate with carbon and on occasion, a binder such as tar, and to operate in an atmosphere of hydrogen or hydrocarbon, the intention being to form magnesium vapour and steam and to discharge them from the furnace by means of the excess of hydrogen employed. The magnesium vapours were to be condensed at a temperature below 1200° C., thereby separating the metal from the other gases, and/or steam.

From the outset, this proposal had no chance of success in practice, because magnesia, as is known, is not reduced by hydrogen, and moreover, any magnesium metal vapour formed by reaction with the carbon contained in the electrode would, at the temperatures involved, necessarily be reoxidised at once by the carbon monoxide formed, as a matter of course, in the reaction.

The present invention provides a process for the reduction of magnesiferous raw materials in the electric furnace by means of silicon (ferro-silicon) and/or aluminium, or other reducing agents forming no gaseous oxidation products, the reaction mixture being introduced into the furnace through a hollow metallic electrode. In this reaction no gaseous products containing oxygen are formed, and by rapidly withdrawing the magnesium vapour from the reaction zone, the reoxidation of the magnesium vapour is avoided.

The decomposition of magnesia, or magnesiferous raw materials, with the aid of silicon (ferro-silicon) and/or aluminium, is known per se. So far, however, as regards effecting this decomposition by the application of temperatures above the melting point of the reaction residues—that is, operating with molten slags—it was proposed to employ an electric shaft furnace, in which the temperature of the reaction mixture was raised to melting point, or to the reaction temperature, between an iron bottom electrode and a top carbon-rod electrode, by resistance heating. The reaction mixture was introduced through a lateral opening above the surface level of the slag, by the aid of a reciprocating plunger.

In contradistinction to the foregoing, according to the present invention, the reaction mixture is continuously introduced through a hollow metallic (preferably iron) electrode which is preferably located in the axis of the furnace, and therefore perpendicular to the surface of the slag. In such case, the reaction begins in the lowermost part of the electrode, and thus close above the transition zone of the current to the surface of the molten slag, or starting point of the electric arc, with the formation, within the hollow electrode, of a sealing column of variable height, of sintered or molten reaction residues which, on the one hand, prevents the overlying mixture from falling into the slag sump, even without the use of any binder, whilst, on the other hand, it ensures, by reason of its relatively good conductivity, the passage of current, or the striking of the arc, over the entire cross-sectional area of the electrode.

The present process offers the advantage that the reaction zone is freely exposed above the molten slag, so that the magnesium vapours, as and when liberated from the reaction mixture, can escape rapidly and freely, or can be carried from the furnace into the condenser by a current of hydrogen. Moreover, since carbon is entirely absent in the reaction zone, there is no possibility of the magnesium vapour becoming reoxidised by carbon monoxide. Finally, the feeding of the reaction mixture into the reaction zone proceeds commensurately with the progressive adjustment of the electrode, without the employment of any mechanically actuated feeding members which are difficult to seal; especially since the reaction mixture is self-sealing in the hollow electrode. Experience has shown that the decomposition proceeds in a perfectly quiet and uniform manner.

The ground and thoroughly mixed charge can be fed loose into the hollow electrode. As a rule, no ramming, or the addition of any special binding medium is required; though, if desired, inorganic, and preferably anhydrous salts, especially chlorides, such as $MgCl_2$, may be added in small quantities to promote sintering or melting of the charge in the lower part of the electrode. Usually, it is advisable, in order to facilitate the removal of the oxidised reaction products from the furnace, to aim at the formation of a mobile, tappable slag, the simplest method being to add silica (sand) or alumina, or clay—and also fluorspar, if desired—to the reaction mixture, without modifying the optimum ratio of 4 molecules of base (MgO, or $MgO+CaO$) per 1 molecule of silicon. This also favours the satisfactory development of a sealing column of sintered or molten reaction mixture at the lower end of the electrode. Binding the reaction mixture by means of the usual carbonaceous materials, such as tar, pitch and the like, is however, intentionally avoided, in order to prevent the formation of carbon monoxide in any circumstances. Whereas, in the case of hollow electrodes of small diameter, the sealing column formed during the reaction is capable in itself of supporting the weight of the overlying loose charge, it is useful in the case of electrodes of larger diameter, to incorporate with the charge turnings, iron or aluminium, strips of sheet metal or similar metallic substances, for the purpose of increasing the cohesion of the charge and to facilitate the striking of the arc.

The hollow electrode itself consists preferably of iron or aluminium, and is advanced into the furnace in proportion as the lower end melts away, the infinite extension of the electrode being effected, in known manner, by welding extension pieces on to the upper rim. The furnace may be operated under a vacuum, or charged, preferably under a slight superatmospheric pressure, with an inert gaseous atmosphere (hydrogen). The slag collecting in the bottom of the furnace and the metal fused from the electrode, are tapped off periodically.

*Example*

A closed electric shaft furnace equipped with a bottom electrode of iron is, prior to being charged, preheated to about 1200° C. by means of a rod-shaped carbon electrode introduced through a suitable opening in the ceiling. This carbon electrode is subsequently replaced by an electrode consisting of a sheet iron pipe, one end of which is closed by a sheet-metal plate welded or otherwise secured to the rim of the tube, and filled with finely ground reaction mixture consisting of 25 parts of (90%) ferro-silicon, 100 parts of calcined dolomite (containing 38% of MgO) and 10 parts of silica (sand). On applying a current of 50 volts, a conducting path is immediately formed and the reaction commences, the electrode melting away continuously while magnesium vapours are uniformly disengaged. By advancing the hollow electrode in proportion as it is consumed the current density is maintained as uniformly as possible. At the same time hydrogen is admitted into the furnace through a lateral supply pipe, the gas carrying away the liberated magnesium vapours into a condensing chamber adjoining the furnace proper where they are condensed to metallic magnesium by cooling in known manner. A yield of 16 parts of metallic magnesium is obtained per 100 parts of dolomite. The current consumption amounts to 12.5 kw.-h. per kg. of magnesium. The resulting slag consists chiefly of calcium silicates, and contains only a small percentage of MgO.

In order that the invention may be more clearly understood, reference is made to the accompanying drawing which illustrates diagrammatically in section a type of apparatus suitable for carrying out the invention.

Said apparatus preferably comprises an electric shaft furnace 1 having a cover 2 provided with an annular water-cooled stuffing box 3 in combination with a coacting gland ring 4. Projecting into the furnace through said stuffing box 3 is a suitable electrically conductive medium in the form of a sheet iron or aluminum tube 5, one end of which is closed by a sheet iron plate 6 welded or otherwise secured thereto. Said tube 5 is filled with the aforementioned finely ground reaction mixture. Provided around the top of the furnace 1 is a tar seal consisting of an annular trough 7 filled with tar into which dips, or projects, an annular flange 8 on an extension 9 of the cover 2. The tar contained in the trough 7 may be heated to a suitable temperature by means of an annular heating pipe 10 located beneath the trough 7. Hydrogen is supplied to the furnace chamber by way of a pipe 11 and the magnesium vapours generated issue through a lateral outlet 12, while slag and iron may be removed through a suitable tap hole 20.

The bottom of the furnace is closed by a plug member 13 of magnesite or other suitable refractory material provided with a series of bores into which are fitted iron rods 14. The bottom electrode comprises a sump 15 of fused iron which is in electrical communication through the rods 14 with a water-cooled metallic conductor 16 in the form of a hollow chamber to which water is supplied by a conduit 17 and from which it is discharged through a conduit 18. The current is supplied to the conductor 16 by way of a conductor bar 19.

I claim:

1. A process for the recovery of magnesium by thermal reduction, comprising progressively introducing a column of a reaction mixture confined in a current-conducting material into a reaction zone, said reaction mixture being exclusive of substances leading to the formation of carbon monoxide or oxygen-containing gases and including a magnesiferous raw material and an agent capable of reducing magnesium oxide while forming non-gaseous oxidation products, establishing an electric arc impinging upon the end of said column at said reaction zone, said current-conducting material serving as a conductor of electric current to the reaction zone, and withdrawing magnesium vapor from said reaction zone.

2. A process for the recovery of magnesium by thermal reduction, comprising progressively introducing a column of a reaction mixture confined in a current-conducting material in a substantially vertical direction into a reaction zone, said reaction mixture being exclusive of substances leading to the formation of carbon monoxide or oxygen-containing gases and including a magnesiferous raw material and an agent capable of reducing magnesium oxide while forming non-gaseous oxidation products, establishing an electric arc impinging upon the end of said column at said reaction zone, said current-conducting material serving as a conductor of electrical current to the reaction zone, and withdrawing metallic magnesium vapor from said reaction zone.

3. An electrode for use in the electrothermal production of magnesium consisting of a metallic sheath, and enclosed therein a column of a mixture exclusive of substances leading to the formation of carbon monoxide or oxygen-containing gases and comprising a magnesiferous raw material; an agent capable of reducing magnesium oxide while forming non-gaseous oxidation products, and at least one non-carbonaceous substance acting as a binder at the temperatures prevailing in the end of said column when projecting into the reaction chamber.

4. An electrode for use in the electrothermal production of magnesium consisting of a metallic sheath and enclosed therein a column of a mixture exclusive of substances leading to the formation of carbon monoxide or oxygen-containing gases and comprising a magnesiferous raw material, an agent capable of reducing magnesium oxide while forming non-gaseous oxidation products, and at least one substance capable of lowering the point of fusion of such reaction mixture.

5. An electrode for use in the electrothermal production of magnesium consisting of a metallic sheath and enclosed therein a column of a mixture exclusive of substances leading to the formation of carbon monoxide or oxygen-containing gases and comprising a magnesiferous raw material, an agent capable of reducing magnesium oxide while forming non-gaseous oxidation products, at least one substance capable of lowering the point of fusion of such reaction mixture, and further at least one non-carbonaceous substance acting as a binder at the temperatures prevailing in the end of said column when projecting into the reaction chamber.

6. An electrode for use in the electrothermal production of magnesium consisting of a sheath formed of iron sheeting, and enclosed therein a column of a mixture exclusive of substances leading to the formation of carbon monoxide or oxygen-containing gases and comprising calcined dolomite and ferro-silicon in proportions adapted to react by way of reduction of the magnesium oxide contained in said calcined dolomite, and a minor proportion of silicic acid.

7. A process for the recovery of magnesium by thermal reduction, comprising providing a column of a reaction mixture confined in a current-conducting material, said reaction mixture being exclusive of substances leading to the formation of carbon monoxide or oxygen-containing gases and including magnesiferous raw material and an agent capable of reducing magnesium oxide while forming non-gaseous oxidation products, advancing said confined column into a closed reaction chamber, said reaction mixture within said confined column being initially retarded, establishing an electric current within said chamber impinging upon the end of said column, said electric arc being adapted to release the flow of the reaction mixture, said current-conducting material serving as a conductor in the establishment of an electric arc, and withdrawing metallic magnesium vapor from said chamber.

8. An electrode for use in the electrothermal production of magnesium, consisting of a metal sheath having an initially closed end and enclosing therein a column of a mixture exclusive of substances leading to the formation of carbon monoxide or oxygen-containing gases and comprising a magnesiferous raw material, an agent capable of reducing magnesium oxide while forming non-gaseous oxidation products, and at least one non-carbonaceous substance acting as a binder at the temperatures prevailing in the end of said column when projecting into the reaction chamber.

9. An electrode for use in the electrothermal production of magnesium, consisting of a metal sheath having an initially closed end and enclosing therein a column of a mixture exclusive of substances leading to the formation of carbon monoxide or oxygen-containing gases and comprising a magnesiferous raw material, an agent capable of reducing magnesium oxide while forming non-gaseous oxidation products, and at least one substance capable of lowering the point of fusion of such reaction mixture.

OSKAR MEYER.